April 22, 1924.
J. OSENKOWSKI
NUT LOCK
Filed March 8, 1923
1,491,163
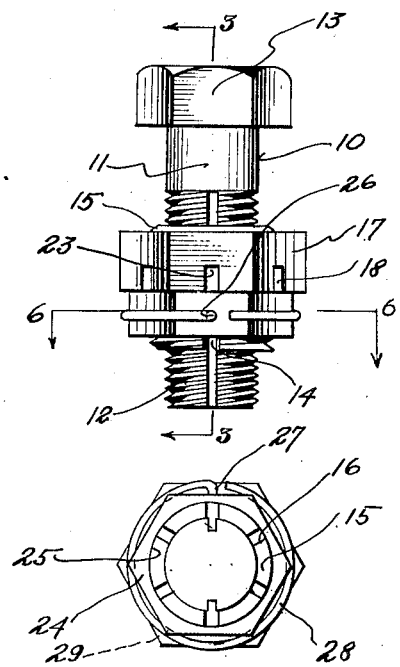
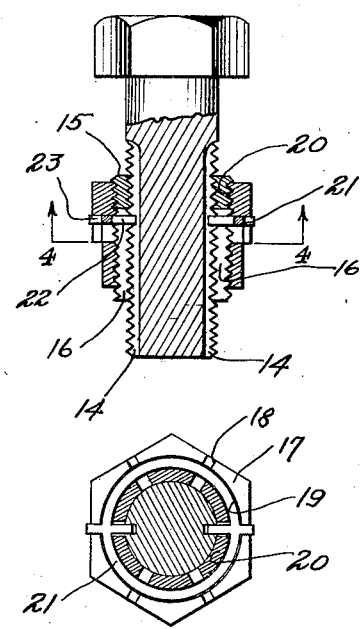
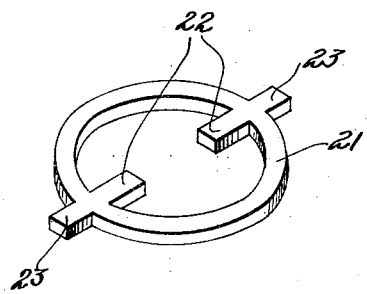
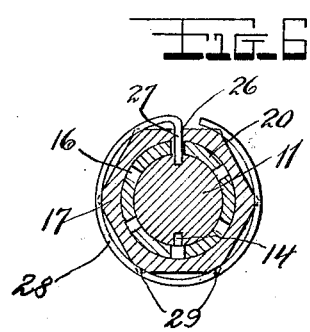
INVENTOR
John Osenkowski
BY *Marvin Laluné*
ATTORNEY Patented Apr. 22, 1924.

1,491,163

UNITED STATES PATENT OFFICE.

JOHN OSENKOWSKI, OF BROOKLYN, NEW YORK.

NUT LOCK.

Application filed March 8, 1923. Serial No. 623,779.

*To all whom it may concern:*

Be it known that I, JOHN OSENKOWSKI, a citizen of Poland, residing at Brooklyn, in the county of Kings and State of New York, have invented certain new and useful Improvements in Nut Locks, of which the following is a specification.

This invention relates to improvements in nut and bolt locks and its principal object is to provide a secure means for preventing turning a nut off of a bolt after the same has been once set up.

Another object of the invention resides in the provision of a device permitting close adjustment of the nut, relative to the device to be clamped, so as to avoid play and the usual wear incident thereto.

With the above and other objects in view, which will become more apparent as the description proceeds, the invention consists in the novel construction, combination and arrangement of parts, which will be fully set forth in the following specification and illustrated in the accompanying drawing, in which:—

Figure 1 is a side view in elevation of the improved nut and bolt lock.

Figure 2 is an end view of Figure 1.

Figure 3 is a view similar to Figure 1, showing the shank of the bolt, the nut and attending details in section.

Figure 4 is a sectional view taken on line 4—4 of Figure 3.

Figure 5 is a perspective view of the locking ring.

Figure 6 is a sectional view taken on line 6—6 of Figure 1.

Referring to the drawing in detail, the numeral 10 designates generally a bolt, comprising the customary shank 11 threaded as at 12 and formed with a head 13 of any preferred shape such as a hexagon.

The shank 11 is provided with diametrically opposed grooves 14 which extend throughout the entire length of the threaded portion 12, as clearly shown in Figures 3 and 4.

An internally and externally threaded cylinder 15, provided with a plurality of diametrically opposed slots 16, is threaded onto the shank 11 and its external diameter is such as to be readily received in the clamping nut, to be more fully hereinafter described.

The clamping nut above referred to is designated by the numeral 17 and is of the castellated type, having inwardly extending, diametrically opposed slots 18 formed centrally of opposite flats.

Formed in one end of the nut 17 is an annular groove 19 arranged concentrically with the threaded opening 20 for the reception of the locking ring to be more fully hereinafter described.

The locking ring above referred to is best shown in Figure 5 and comprises an annular body 21, formed at diametrically opposite points with the inwardly and outwardly extending locking tongues 22 and 23.

This ring or body 21 is of the proper size to snugly fit within the groove 19 of the nut 17 and the inwardly extending tongues 22 are of such length as to extend through the slots 16 and into the grooves 14 of the shank 11, while the tongues 23 project radially through slots 18 of the nut 17, thereby tying the whole together and preventing relative rotation of the nut and bolt.

In order to retain the ring or body 21 in the groove 19, a supplementary locking nut 24 is provided with an internally threaded axial opening 25 of a size to receive the cylinder 15.

Formed centrally of one of the flats of the nut 24 is a radial opening 26 for the reception of an angular extension 27, formed at the end of a circular piece of spring wire 28, arranged to lie in the annular groove 29 formed in the outer surface of the nut 24.

In use the cylinder 15 is threaded onto the shank 11 and turned up to engage the object to be clamped. The nut 17 is then threaded onto the cylinder 15 and drawn down tightly against the object to be clamped.

It is to be understood that in each operation certain of the slots 16 and 18 of the cylinder 15 and 17 respectively must be alined with the grooves 14.

The locking ring 21 is then slipped into place within the groove 19 so that the tongues 22 will extend thru the slots 16 and into the grooves 14.

Obviously such action will effectively lock the shank 11 and cylinder 15 against relative rotation.

Simultaneously with the placing of the ring 21 as described, the tongues 23 will enter the slots 18 of the nut 17, thereby locking the nut against rotation.

In order to retain the ring 21 in place, the supplementary locking nut 24 is threaded onto that portion of the cylinder projecting beyond the nut 17.

It is to be understood that the angular extension 27 of the spring 28 is withdrawn during the turning on of the bolt 24 and after the same has been turned up into position, the extension 27 is released and permitted to project through the opening 26 and one of the slots 16 into one of the grooves 14.

Obviously such action will lock the supplementary locking nut against rotation and thus prevent its backing off and away from the nut 17.

While in the foregoing there has been shown and described the preferred embodiment of this invention, it is to be understood that certain minor changes in the details of construction, combination and arrangement of parts may be resorted to without departing from the spirit and scope of the invention as claimed.

What I claim and desire to secure by Letters Patent, is:—

1. A nut lock comprising a bolt having a grooved shank, a cylinder adapted to be threaded on the shank, said cylinder having longitudinal slots therein, a nut adapted to be threaded on the cylinder, a ring adapted to fit in the nut and tongues on the ring projecting through the slots in the cylinder and into the grooves in the shank to lock the cylinder against rotation, and radial means on the ring to lock the nut against rotation.

2. A nut lock comprising a bolt having a grooved shank, a cylinder adapted to be threaded on the shank, said cylinder having longitudinal slots therein, a nut threaded on the cylinder, said nut having an annular recess in one end, said nut also having radial slots communicating with the recess, a ring adapted to be seated in the recess, inwardly extending tongues on the ring projecting through the slots in the cylinder and into the grooves in the shank, radial tongues on the ring adapted to enter the slots in the nut, and a supplemental locking means for retaining the ring in place.

3. A nut lock comprising a bolt having a grooved shank, a slotted cylinder threaded thereon, a nut threaded on to the cylinder, said nut having an annular recess in one end and being provided with radial slots, a ring adapted to seat in the recess in the nut, radial tongues on the ring adapted to seat in the recesses in the nut, tongues projecting inwardly from the inner edge of the ring, a supplementary nut threaded onto the cylinder to retain the ring in place, and means carried thereby to prevent its backing off and allowing the ring to leave the recess.

In witness whereof I have affixed my signature.

JOHN OSENKOWSKI.